(12) United States Patent
Heon et al.

(10) Patent No.: US 12,172,483 B2
(45) Date of Patent: Dec. 24, 2024

(54) EASILY RETROFITTABLE AIR SUSPENSION BRACKETS, METHOD OF MAKING AND METHOD OF USING

(71) Applicant: Wheel Pros, LLC, Greenwood Village, CO (US)

(72) Inventors: Reno Heon, San Luis Obispo, CA (US); Dustin Heon, Arroyo Grande, CA (US)

(73) Assignee: Wheel Pros LLC, Greenwood Vlg, CO (US)

(*) Notice: Subject to any disclaimer, the term of this patent is extended or adjusted under 35 U.S.C. 154(b) by 0 days.

(21) Appl. No.: 18/241,961

(22) Filed: Sep. 4, 2023

(65) Prior Publication Data
US 2024/0075781 A1 Mar. 7, 2024

Related U.S. Application Data

(63) Continuation-in-part of application No. 17/902,968, filed on Sep. 5, 2022, now Pat. No. 11,745,556.

(51) Int. Cl.
*B60G 11/28* (2006.01)

(52) U.S. Cl.
CPC ................. *B60G 11/28* (2013.01)

(58) Field of Classification Search
CPC ....... B60G 11/28; B60G 11/46; B60G 11/465; B60G 2204/4306; B60G 2204/126; B60G 2206/911; B60G 11/113; B60G 2204/12
See application file for complete search history.

(56) References Cited

U.S. PATENT DOCUMENTS

| | | | |
|---|---|---|---|
| 2,874,956 A * | 2/1959 | La Belle | B60G 11/465 267/31 |
| 5,692,865 A * | 12/1997 | Pratt | A43C 15/02 411/517 |
| 2008/0023931 A1* | 1/2008 | Myers | B60G 11/28 280/124.157 |

(Continued)

FOREIGN PATENT DOCUMENTS

| | | | |
|---|---|---|---|
| CN | 117124786 A * | 11/2023 | F16F 13/002 |
| JP | 3217201 U * | 7/2018 | |

OTHER PUBLICATIONS

Watanabe, Lower Bracket and Air Spring Mounting Structure, Jul. 26, 2018, EPO, JP 3217201 U, Machine Translation of Description (Year: 2018) (Year: 2018).*

*Primary Examiner* — Paul N Dickson
*Assistant Examiner* — Matthew D Lee
(74) *Attorney, Agent, or Firm* — Eric Hanscom (57) ABSTRACT

A retrofittable rear aft suspension assembly comprises an air spring retained between an air spring upper mount and an air spring lower mount. The air spring lower mount is attached to the leaf spring or axle, while the air spring upper mount is attached to the vehicle chassis through U-bolts, quarter turn nuts, C-straps or an adjustable chassis hook. This allows an installer to quickly install and remove an air spring to a wide variety of chassis types without having to access the difficult-to-reach regions behind the chassis, or damage the chassis through welding, cutting or drilling additional holes. A cradle extends from the air spring upper mount under the chassis to carry the majority of the vertical load from the air spring to the bottom of the chassis.

18 Claims, 5 Drawing Sheets

(56) References Cited

U.S. PATENT DOCUMENTS

| | | | |
|---|---|---|---|
| 2014/0117640 A1* | 5/2014 | Lamberti | F16F 3/0873 280/124.164 |
| 2023/0184352 A1* | 6/2023 | Smith | B60R 16/08 248/634 |

* cited by examiner

EASILY RETROFITTABLE AIR SUSPENSION BRACKETS, METHOD OF MAKING AND METHOD OF USING

CROSS REFERENCE TO RELATED APPLICATIONS

This utility patent application claims priority back to U.S. Utility Ser. No. 17/902,968, filed Sep. 5, 2022, the contents of which are incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of suspension for vehicles, and more particularly to novel technology relating to the manufacturing of efficient and effective air suspension brackets that can be easily retrofitted onto existing vehicular chassis. In particular, the product is designed for pickup truck chassis but has applicability to other types of vehicles as well. This patent application covers the method of using the product, the method of making the product and the end product itself.

Background of the Invention

Pickup trucks are used for a variety of punishing purposes, including carrying heavy loads and driving over rough roads. Most pickup trucks are factory equipped with leaf-spring rear suspension which does not have the ability to level for load. This creates a desire for an easily retrofittable air suspension system. However, retrofitting a new air suspension system onto an existing vehicle chassis is currently difficult and often results in less-than-ideal stress on the resulting point of attachment.

Problem Described

There are two basic types of pickup truck chassis: C-shaped and Box shaped. When installing the upper mounting brackets for an air suspension system to a box shape chassis, conventional solutions require the installer to reach inside the chassis with stick nuts in order to affix the air spring brackets to the outer chassis surface which takes a significant amount of time and often results in frustration for the installer. Conventional designs have the additional drawback of applying the air spring forces to the outer chassis surface in a way that the chassis material was not engineered for which can eventually fatigue the chassis material.

Summary of Invention

The invention is a retrofittable rear aft suspension assembly which uses some combination of "U-shaped" bolts, quarter turn nuts, C-straps, and adjustable chassis hooks to affix the air spring brackets to the vehicle chassis. An air spring is retained between an air spring upper mount and an air spring lower mount. The air spring lower mount is attached to the leaf spring or axle, while the air spring upper mount is attached to the vehicle chassis through U-bolts, quarter turn nuts, C-straps or an adjustable chassis hook. This allows an installer to quickly install and remove an air spring to a wide variety of chassis types without having to access the difficult-to-reach regions behind the chassis, or damage the chassis through welding, cutting or drilling additional holes. A cradle extends from the air spring upper mount under the chassis to carry the majority of the vertical load from the air spring to the bottom of the chassis and restricts the vertical movement of the air spring and its mounting devices. This effectively distributes the load on the chassis member in a manner appropriate in terms of the chassis member design. The cradle is an important safety feature in cases where the installed under-torques the U-bolts and other attachment devices. In addition to faster and less stressful installation, the invention provides a better engineered means of attachment such that there is less overall fatigue, and the modularity of the invention allows for it to be easily, removed, repaired and serviced.

Advantages Over Prior Art

The invention provides a number of improvements over existing technologies. The invention described herein utilizes a U-bolts to easily affix the upper air spring brackets around the entire circumference of a chassis. The invention also includes redundant support structures ("cradles") which limit the potential vertical displacement of the upper air spring brackets in case the installer under-torques the U-bolts. This invention results in significantly faster installation time combined with added rigidity and lack of chassis fatigue concerns over all conventional designs. Additional embodiments of the general concept include the use of quarter turn nuts, C-straps, and adjustable chassis hooks.

Brief Description of Commercial Advantages

Compared to the state-of-the-art designs, the invention provides an air suspension system to be quickly and easily installed to beside of the box chassis of a pickup truck. A variant of the design also allows this invention to be used on older "C" shaped chassis. Benefits include:

Faster installation time—Avoids the use of "stick nuts" that must be fished inside of the box chassis on conventional designs. Simple U-bolts are fast to install around the outside of the chassis and the nuts can be torqued from the outside of the vehicle while the wheel and tire are removed.

Reduced installation error—Features that reference factory hole locations on the chassis along with the redundant "cradle" structures allow the installer to accurately position the assembly on the chassis prior to tightening the U-bolts.

Avoids frame fatigue—Avoids applying the air spring load to only the outer chassis surface which causes chassis fatigue in conventional systems. The invention described herein instead distributes the air spring load across the entire chassis structure.

Prior Art

The prior art provides the current state-of-the-art in installable air springs.

For example, US Patent Publication 20090278290 provides an air spring generally comprises a first end closure, a flexible member coupled to the first end closure and defining a chamber that can be pressurized, and a first mounting member projecting from the first end closure in a first direction. However, this method of attachment uses barbs rather than U-Bolts, so it is more difficult to install and does not alleviate the stresses on the chassis that the current invention avoids.

Similarly, U.S. Pat. Nos. 9,649,906, 3,730,550 and CA2583991 provide two other air spring attachment methods, but both of these requires bolting the air spring assembly to the vehicle chassis, which will result in more stresses onto the chassis due to the bolt holes. The current invention provides a solution that does not include having to drill any holes into the vehicle chassis, thereby creating a more easily installed product without damage to the vehicle chassis.

U.S. Ser. No. 10/994,581 describes a spread active clamp group for vehicle leaf spring, which is overly complicated compared with the current invention. CN113547884 and CN113829820 to Dongfen Liuzhou Motor covers a composite air suspension system with a frame, a spring suspension and an axle, where the spring suspension comprises a steel plate spring, an air spring, a shock absorber, a front support, a lifting lug and a rear support; and the air spring bears the whole sprung mass, and the leaf spring is in the reverse bow state, so that the deformation of the leaf spring can be reduced, the working stress of the leaf spring is obviously reduced, the fatigue damage of the leaf spring is slowed down, and the service life of the leaf spring is prolonged. This invention, however, only works on the front suspension of a large truck or other large vehicle, as opposed to the current invention which is specifically designed to work on the back suspension of a regular passenger vehicle such as a pickup truck. This invention, like the previous one, is overly complicated and expensive when compared to the current invention.

Likewise, Chinese patent No. CN215510772 to FAW Jiefang Automotive describes another front suspension system with a front air suspension that is symmetrically arranged at two ends of a front axle and comprises a steel plate spring, a lifting ring, an air spring assembly and a longitudinal reaction rod, the lifting ring is hinged to a frame, the steel plate spring is integrally arranged, the front end of the steel plate spring is hinged to the frame, the rear end of the steel plate spring is hinged to the lifting ring, the air spring assembly comprises a base and an air spring, the base is connected to the front axle and tightly presses the steel plate spring on the front axle, one end of the air spring is connected to the frame, the other end of the air spring is connected to the base, the longitudinal reaction rod is perpendicular to the front axle, one end of the longitudinal reaction rod is connected to the frame, and the other end of the longitudinal reaction rod is connected to the base; the automobile comprises the front air suspension. The longitudinal reaction rod can resist longitudinal impact force, so that S-shaped deformation of the steel plate spring during braking is limited, the steel plate springs are integrally arranged, a plurality of steel plate springs are not required to be added for reinforcement, and the running stability of the automobile is kept. As with the previous two prior arts, however, this system is designed for a front suspension while the current invention is designed for the rear suspension.

The prior art also features CN216915434 to Shanghai Nomang Information Technology Co Ltd, which provides an air suspension middle lifting device that relies on a pair of U-shaped poles that run through a mounting plate downside, with a steel sheet is located the inboard of U-shaped pole down, allowing a dead axle all to run through on every U-shaped pole. This invention, however, does not offer a compact, easily installed and replaced air suspension device that works on the rear suspension of a vehicle.

CN215244212 to Jiangxi Isuzu Motors discloses a combination suspension structure combining a steel plate spring and an air spring, with the steel plate springs positioned at two sides of a vehicle body, two air springs positioned at the center of the steel plate springs, a rear axle positioned between two hubs, a transverse stabilizer bar, a vehicle body height sensor and a shock absorber; the two ends of the leaf spring are fixed on the frame through hinges and lifting lugs respectively, and the connecting end of the transverse stabilizer bar is hinged with the frame and used for improving transverse tilting of the vehicle. This invention does not solve the problem that the current invention solves.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

The present invention is a uniquely designed air spring retention device, utilizing unique and effective/efficient technologies to create a superior, cost-effective product that is significantly easier to install and maintain, as well as providing a more structural sound attachment to the chassis of a vehicle. The various advantages provided by this invention are described more fully with respect to the drawings that have been provided.

Figure 1:
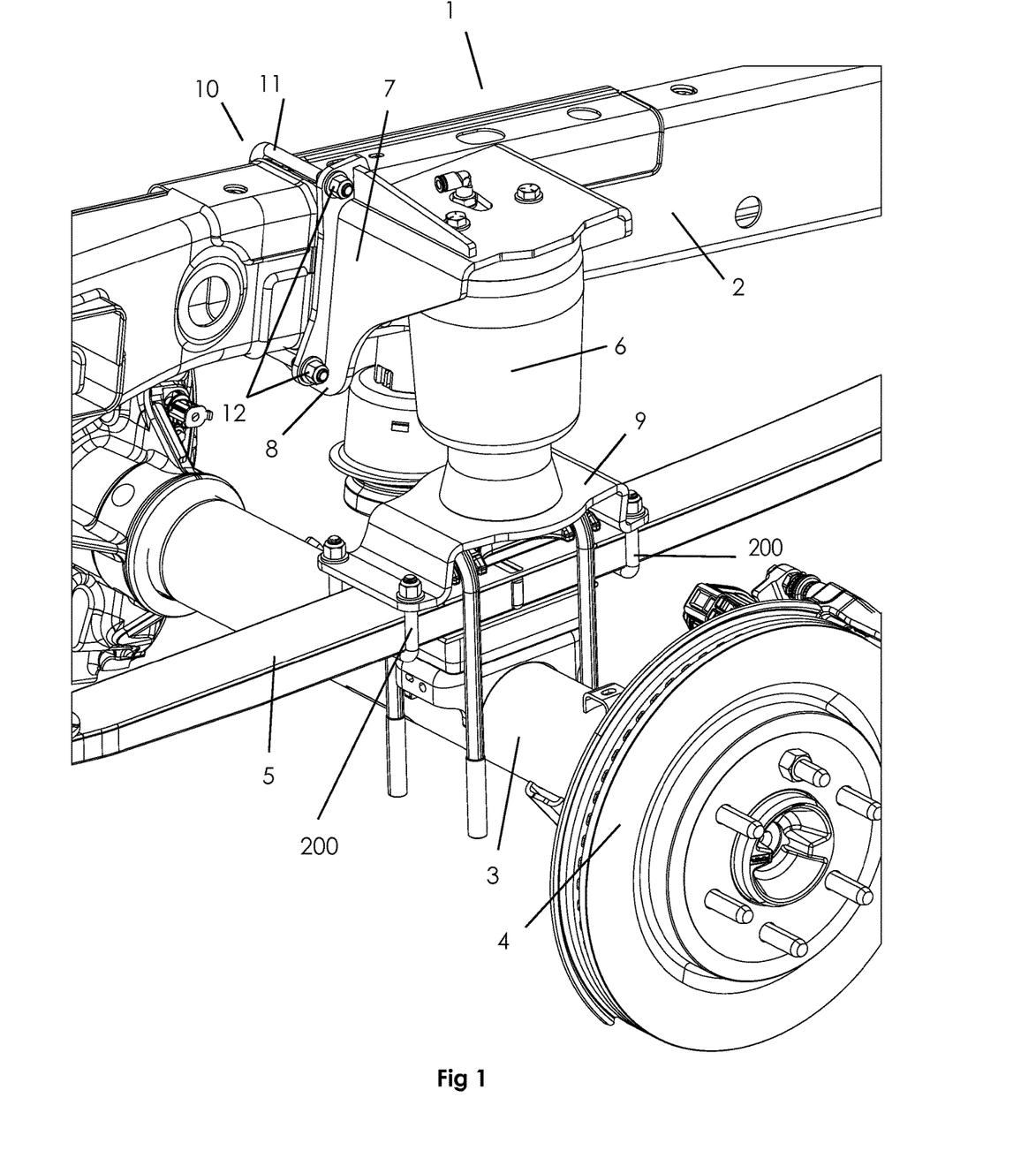
FIG. 1 is a side, perspective view of one preferred embodiment of the air spring bracket.

FIG. 1 is a side, perspective view of one preferred embodiment of the air spring bracket, referenced generally as a rear air spring assembly 1. When a vehicle such as a pickup truck is sold, it comes with a Factory Leaf Spring 5 that provides suspension between the Vehicle Chassis 2 and the Axle 3. The Wheel Mounting Hub 4 is attached to the Axel 3, and wheels are tires are attached to the Wheel Mounting Hub 4. Attached to the Vehicle Chassis 2 is an air spring upper mount 7. An Air Spring 6 is secured between the Air Spring Upper Mount 7 and the Air Spring Lower Mount 9. The rear air spring assembly 1, can be secured to the vehicle chassis 2 by several methods. In the embodiment illustrated in FIG. 1, the "attachment device" is an air spring upper mount U-Bolt attachment device, generally referenced as 10. Making up this device is a U-Bolt 11 that encircles the vehicle chassis 2. The two threaded ends of the U-Bolt pass through holes in a cradle 8 of the air spring upper mount 7, and are secured with U-Bolt nuts 12. The air spring lower mount 9 is secured to the vehicle suspension leaf spring 5 by leaf spring U-bolts 200. This method of attachment allows the air spring to be attached easily (and just as easily removed), without the need to drill holes, weld, or take any other actions that would damage the vehicle chassis or leaf springs.

This invention allows an installer to merely attach the air spring lower mount 9 to the vehicle suspension leaf spring 5, then snap the U-Bolts 11 around the vehicle chassis 2 and use nuts 12 to secure the U-Bolts to the vehicle chassis, thereby securing the air spring upper mount 7 to the vehicle chassis 2. By not having to reach around behind the back of the chassis, the installer can skip the most difficult and stressful part of the current installation practice done under the prior art. By completely encircling the vehicle chassis, the method of attachment evenly distributes the force, providing a means of attachment to the vehicle chassis that causes less fatigue in the metal and avoids damaging the vehicle chassis through drilling, cutting or welding.

Figure 2:
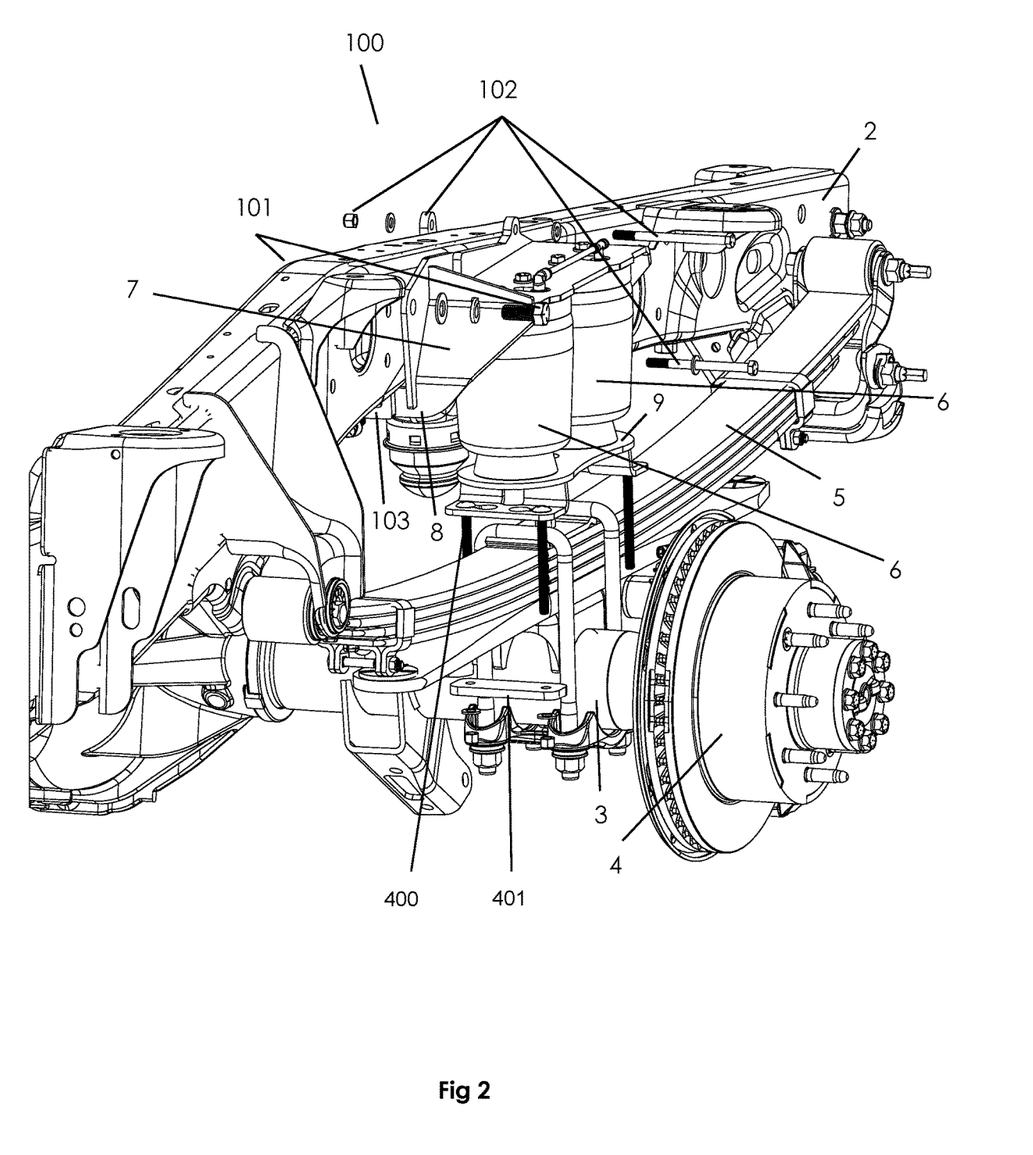
FIG. 2 is a side, exploded, perspective view of another embodiment comprising additional attachment devices.

FIG. 2 is a side, exploded, perspective view of another embodiment comprising additional attachment devices. In this figure, a second embodiment of the rear air suspension assembly 100 is illustrated. In this embodiment, the theory behind the function is the same: allow an installer to avoid the most cumbersome and time-consuming parts of an air spring installation, and do not damage or weaken the vehicle chassis or leaf springs in the process. In this illustration, the air spring upper mount quarter turn nut attachment device 101 is shown from a front angle. The quarter turn nut has already been secured in an existing hole in the vehicle chassis 2, and a quarter turn bolt is going to be inserted to secure the air spring upper mount 7 to the chassis 2. Reference number 102 shows two bolts for a C-strap ready to be passed through holes in the air spring upper mount 7, to be secured to the opposite end of a C-strap. Reference number 103 shows the adjustable chassis hook ready to be slid up against the back side of the vehicle chassis 2 and secured.

Figure 3:
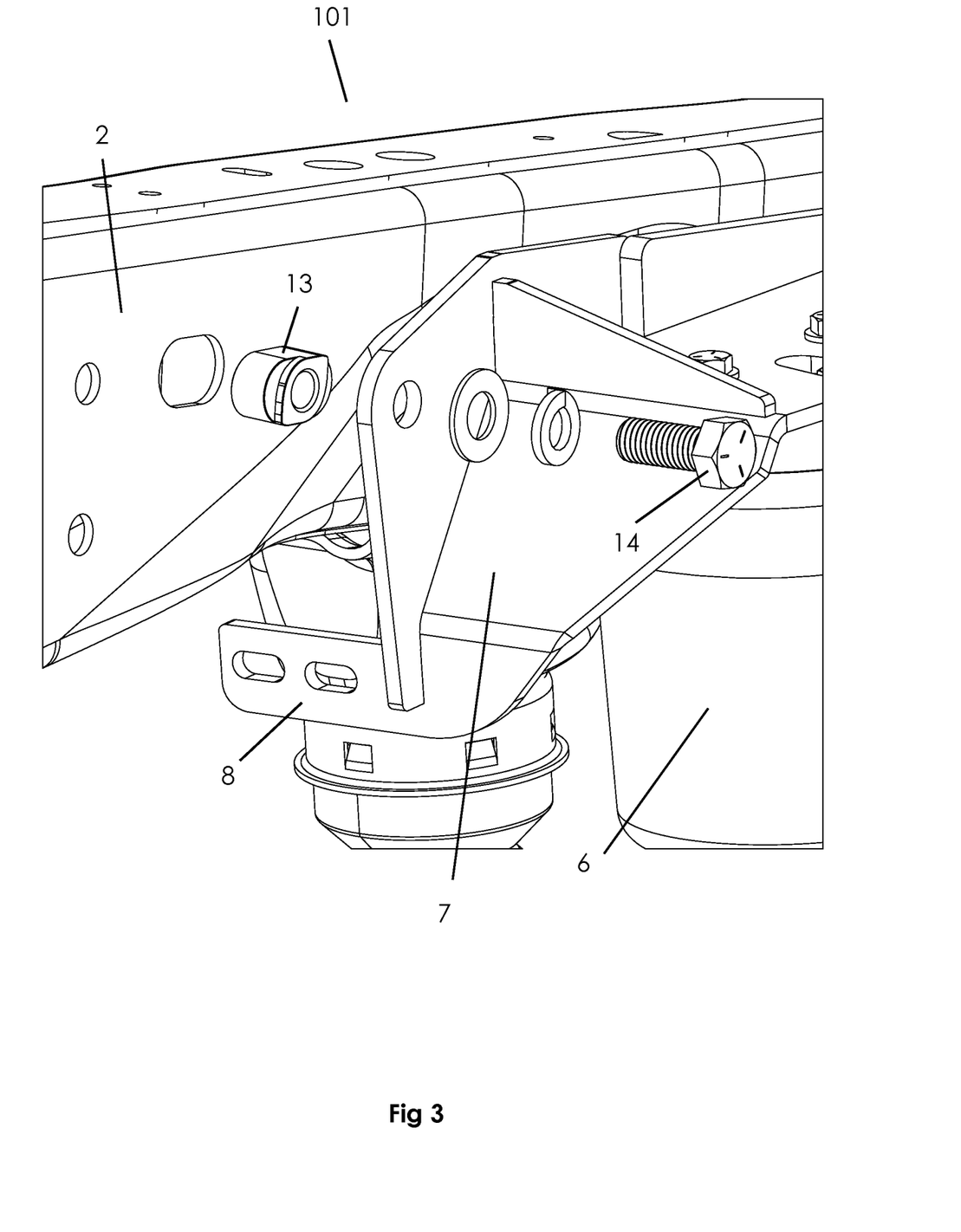
FIG. 3 is a detailed, exploded view of the embodiment shown in FIG. 2 illustrating the quarter turn nut attachment device.

FIG. 3 is a detailed, exploded view of the embodiment 101 shown in FIG. 2 illustrating the quarter turn nut attachment device. In this figure, one can clearly see the quarter turn nut 13 being inserted into an existing hole in the vehicle chassis 2. Because the hole is pre-existing, there is no need to drill holes in the chassis or weld any part of this invention to the chassis. Once the quarter turn nut 13 is inserted into the hole, it is rotated 90 degrees to removably secure it to the vehicle chassis 2. At this point, the air spring upper mount 7 is pushed toward the vehicle chassis 2, and quarter turn bolt 14 passes through washers before entering holes in the air spring upper mount 7 to mate with threads in the quarter turn nut 13. This method attaches the air spring upper mount 7 to the vehicle chassis 2, and brings the air spring upper mount cradle structure 8, under the vehicle chassis 2.

Figure 4:
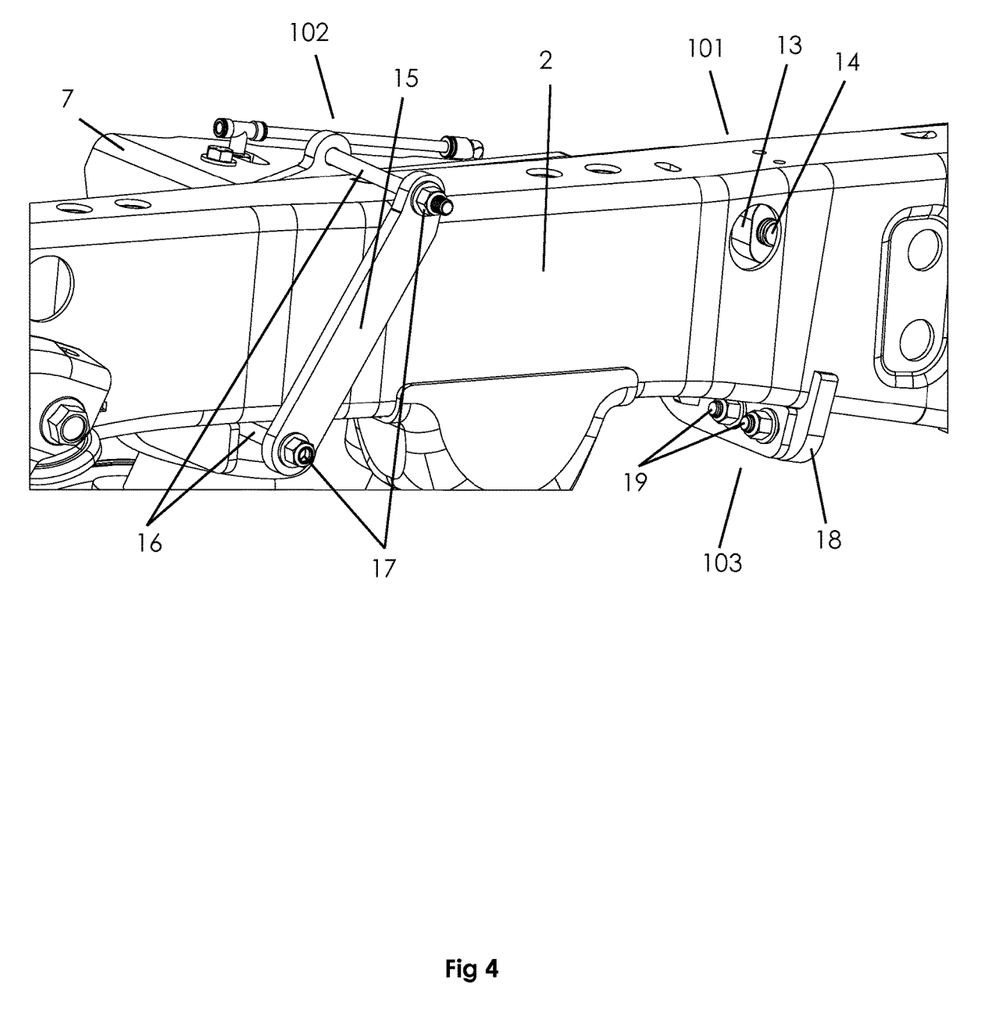
FIG. 4 is a detailed, assembled view of the embodiment shown in FIG. 2 illustrating the quarter turn nut, the C-strap, and adjustable chassis hook attachment devices.

FIG. 4 is a detailed, assembled view of the embodiments 101, 102 and 103 shown in FIG. 2 illustrating the quarter turn nut, the C-strap, and adjustable chassis hook attachment devices.

The air spring upper mount quarter turn nut attachment device, generally referenced as 101, shows the quarter turn nut 13 that has already been rotated to secure it in the existing hole in the vehicle chassis 2. The quarter turn bolt 14 has been screwed into the quarter turn nut 13 to secure the air spring upper mount (not visible in this drawing) to the side of the vehicle chassis 2.

The air spring upper mount C-Strap attachment device, generally referenced as 102, is another device which allows an installer to quickly and easily install an air spring without damaging the chassis or leaf springs of the vehicle. In this embodiment, two bolts for C-strap 16 extend from holes in the air spring upper mount 7 and connect to opposite ends of a C-strap 15, secured by nuts for C-strap 17. The C-Strap attachment device works similarly to a U-bolt attachment device, but provides additional strength as required.

The air spring upper mount adjustable chassis hook attachment device, generally referenced as 103, is attached to the cradle 8 of air spring upper mount 7 as seen in FIG. 3. The adjustable frame hook 18, extends from cradle 8 of the air spring upper mount 7 and "hooks" the back side of the vehicle chassis 2. Two adjustable frame hook fasteners 19, adjustably secure the adjustable chassis hook 18 to the cradle 8 of air spring upper mount 7 at a length suitable for "hooking" under the vehicle chassis 2. This adjustable feature allows the device to be used on a wide range of vehicles with chassis of different widths.

Figure 5:
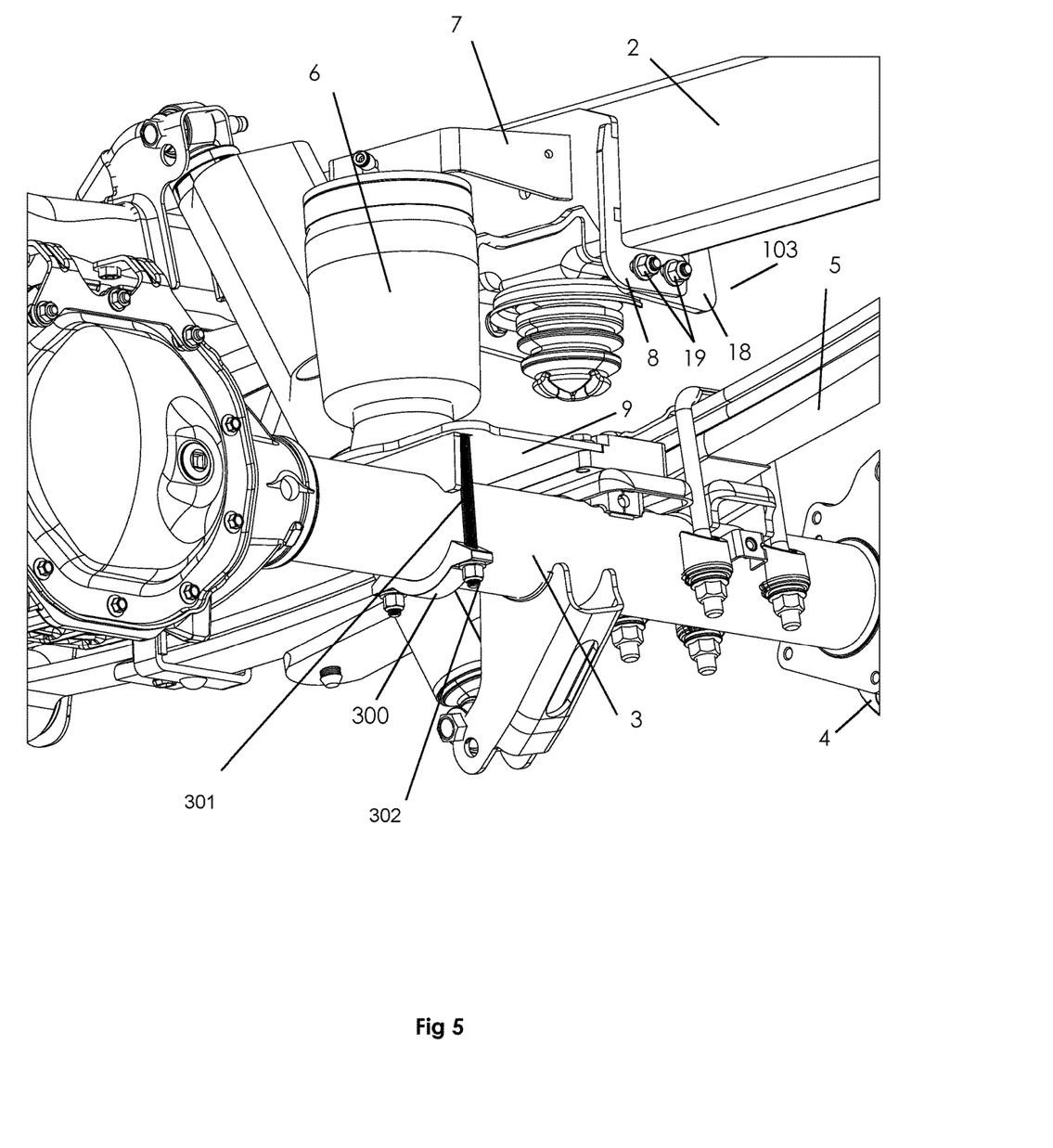
FIG. 5 is a perspective view of another embodiment of the invention in which the lower mount of the air spring is attached to the axel rather than the leaf spring.

FIG. 5 is a perspective view of another embodiment of the invention in which the lower mount of the air spring is attached to the axel rather than the leaf spring. Here, the air spring lower mount 9 has several holes, through which axel clamping bolts 301 are inserted. A saddle-shaped axel attachment device 300 has two holes into which the axle clamping bolts are inserted, and then secures with axle clamping nuts 302. This figure also illustrates another view of the adjustable frame hook feature previously described in FIG. 4.

It should be noted that the phrase "suspension member" encompasses both axles and leaf springs, and it is contemplated that the invention can attach to either axels or leaf springs. As with the embodiments of the air spring upper mount, the air spring lower mount can be attached to either the axle or the leaf spring without any need for drilling, welding, cutting, or any other modification of the original chassis or leaf spring for installation.

No matter which attachment device is used, the goal of easy access to working surfaces and no damage to the chassis or leaf springs is obtained through the design of this invention. It should be noted that, as opposed to the prior art, this adjustable feature of this invention allows for the quick and easy installation and removal of an air spring on a wide variety, shapes and sizes of vehicle chassis. Since all the embodiments of the attachment device either encircle the chassis or rely on pre-existing holes that were manufactured into the chassis, the invention allows for the attachment of air spring brackets without the need to modify, cut, drill or weld any part of the vehicle. This is crucial as if an installer weakens and damages the vehicle chassis, the purpose of an air spring becomes worthless. To be clear, one of the inventive steps of this device is that it can installed upon an unmodified chassis, where unmodified chassis is defined as a chassis in its original form, as manufactured, without the need for any cutting, drilling or welding to attach the device to the chassis.

The adaptability of the attachment device allows for the invention to be used on a wide variety of vehicle types with an even wider range of chassis heights, widths and overall shapes. The device can also, because of its adjustability, take advantage of a wide variety of existing holes that were manufactured into the chassis during its initial construction—as opposed to drilling additional holes just to install the air spring. By "working around" the chassis as it was manufactured, this device also avoids potentially damaging the existing wiring, plumbing, etc. that were installed onto the chassis when the vehicle was manufactured, as opposed to drilling and cutting new holes with the hope that the installer doesn't cut anything crucial.

Another key feature of this invention is the cradle structure that extends from the air spring upper mount under the vehicle chassis. The cradle is designed to carry the majority of the vertical load from the air springs to the bottom of the chassis. This reduces the amount of shear load on the various attachment devices and serves to optimally secure the device to the vehicle chassis.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

Many aspects of the invention can be better understood with references made to the drawings as attached. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What I claim is:

1. A rear air suspension bracket assembly device comprising, an air spring, an air spring upper mount, an air spring lower mount, wherein the air spring upper mount has a cradle, wherein the air spring lower mount is attached to a suspension member, wherein the air spring upper mount is attached to an unmodified chassis by an upper attachment device, where the air spring is secured at an upper end to the air spring upper mount, and where the air spring is secured at a lower end to the air spring lower mount, wherein the air spring lower mount is secured to the suspension member by a lower attachment device, wherein the cradle structure extends under the unmodified vehicle chassis and provides an amount of limitation to movement of the device against the vehicle frame, wherein the upper attachment device is one or more U-Bolts, wherein the one or more U-Bolts encircle the unmodified vehicle chassis, and wherein the U-Bolts are attached to both the cradle structure and the air spring upper mount by a plurality of U-Bolt nuts.

2. The rear air suspension bracket assembly device of claim 1, wherein the suspension member is a leaf spring, and wherein the air spring lower mount is attached to a leaf spring by the lower attachment device, wherein the lower attachment device is two leaf spring U-bolts and four leaf spring U-bolt nuts.

3. The rear air suspension bracket assembly device of claim 1, wherein the suspension member is a leaf spring, and wherein the air spring lower mount is attached to a leaf spring by the lower attachment device, wherein the lower attachment device is a steel plate, two clamping bolts and two clamping nuts, wherein the two clamping bolts are inserted through two air spring lower mount holes, wherein the steel plate has two steel plate holes, into which the two clamping bolts are inserted, wherein the steel plate and the two clamping bolts are secured with two clamping screws.

4. The rear air suspension bracket assembly device of claim 1, wherein the suspension member is an axle, and wherein the air spring lower mount is attached to an axle by the lower attachment device, wherein the lower attachment device is an axle clamping device, one or more axle U-bolts, one or more U-bolt nuts, wherein the axle U-bolts are inserted around the axle and through two air spring lower mount holes, then secured with U-bolt nuts.

5. The rear air suspension bracket assembly device of claim 1, wherein the suspension member is an axle, wherein the lower attachment device is an axel attachment device, two axle clamping bolts and two axel clamping nuts, wherein the axle attachment device is a saddle-shape member with two axle attachment holes, wherein the two axel clamping bolts are inserted through two air spring lower mount holes, wherein the axel clamping bolts are inserted through the two axle attachment holes in the axle attachment device, wherein the axle attachment device and the two axel clamping bolts are secured with two axle clamping screws.

6. A rear air suspension bracket assembly device comprising, an air spring, an air spring upper mount, an air spring lower mount, wherein the air spring upper mount has a cradle, wherein the air spring lower mount is attached to a suspension member, wherein the air spring upper mount is attached to an unmodified chassis by an upper attachment device, wherein the air spring is secured at an upper end to the air spring upper mount, and wherein the air spring is secured at a lower end to the air spring lower mount, wherein the air spring lower mount is secured to the suspension member by a lower attachment device, wherein the cradle structure extends under the unmodified vehicle chassis and provides an amount of limitation to movement of the device against the vehicle frame, wherein the upper attachment device is one or more adjustable chassis hooks, wherein the adjustable chassis hooks are attached to the cradle of the upper air spring mount by two or more adjustable chassis hook fasteners.

7. The rear air suspension bracket assembly device of claim 6, wherein the one or more adjustable chassis hooks include slotted holes to allow the hooks to be secured against varying chassis widths before tightening the two or more adjustable frame hook fasteners.

8. The rear air suspension bracket assembly device of claim 6, wherein the suspension member is a leaf spring, and wherein the air spring lower mount is attached to a leaf spring by the lower attachment device, wherein the lower attachment device is two leaf spring U-bolts and four leaf spring U-bolt nuts.

9. The rear air suspension bracket assembly device of claim 6, wherein the suspension member is a leaf spring, and wherein the air spring lower mount is attached to a leaf spring by the lower attachment device, wherein the lower attachment device is a steel plate, two clamping bolts and two clamping nuts, wherein the two clamping bolts are inserted through two air spring lower mount holes, wherein the steel plate has two steel plate holes, into which the two clamping bolts are inserted, wherein the steel plate and the two clamping bolts are secured with two clamping screws.

10. The rear air suspension bracket assembly device of claim 6, wherein the suspension member is an axle, and wherein the air spring lower mount is attached to an axle by the lower attachment device, wherein the lower attachment device is an axle clamping device, one or more axle U-bolts, one or more U-bolt nuts, wherein the axle U-bolts are inserted around the axle and through two air spring lower mount holes, then secured with U-bolt nuts.

11. The rear air suspension bracket assembly device of claim 6, wherein the suspension member is an axle, wherein the lower attachment device is an axel attachment device, two axle clamping bolts and two axel clamping nuts, wherein the axle attachment device is a saddle-shape member with two axle attachment holes, wherein the two axel clamping bolts are inserted through two air spring lower mount holes, wherein the axel clamping bolts are inserted through the two axle attachment holes in the axle attachment device, wherein the axle attachment device and the two axel clamping bolts are secured with two axle clamping screws.

12. A rear air suspension bracket assembly device comprising, an air spring, an air spring upper mount, an air spring lower mount, wherein the air spring upper mount has a cradle, wherein the air spring lower mount is attached to a suspension member, wherein the air spring upper mount is attached to an unmodified chassis by an upper attachment device, wherein the air spring is secured at an upper end to the air spring upper mount, and wherein the air spring is secured at a lower end to the air spring lower mount, wherein the air spring lower mount is secured to the suspension member by a lower attachment device, wherein the cradle structure extends under the unmodified vehicle chassis and provides an amount of limitation to movement of the device against the vehicle frame, wherein the upper attachment device is one or more C-strap attachment devices, wherein the one or more C-strap attachment devices each comprise the C-strap and two bolts for C-strap, wherein the two bolts for C-strap are secure to opposite ends of the C-strap by nuts for C-strap, wherein the one or more C-strap attachment devices encircle the unmodified vehicle chassis, and secure the air spring upper mount to the vehicle chassis.

13. The rear air suspension bracket assembly device of claim 12, wherein the suspension member is a leaf spring, and wherein the air spring lower mount is attached to a leaf spring by the lower attachment device, wherein the lower attachment device is two leaf spring U-bolts and four leaf spring U-bolt nuts.

14. The rear air suspension bracket assembly device of claim 12, wherein the suspension member is a leaf spring, and wherein the air spring lower mount is attached to a leaf spring by the lower attachment device, wherein the lower attachment device is a steel plate, two clamping bolts and two clamping nuts, wherein the two clamping bolts are inserted through two air spring lower mount holes, wherein the steel plate has two steel plate holes, into which the two clamping bolts are inserted, wherein the steel plate and the two clamping bolts are secured with two clamping screws.

15. The rear air suspension bracket assembly device of claim 12, wherein the suspension member is an axle, and wherein the air spring lower mount is attached to an axle by the lower attachment device, wherein the lower attachment device is an axle clamping device, one or more axle U-bolts, one or more U-bolt nuts, wherein the axle U-bolts are inserted around the axle and through two air spring lower mount holes, then secured with U-bolt nuts.

16. The rear air suspension bracket assembly device of claim 12, wherein the suspension member is an axle, wherein the lower attachment device is an axel attachment device, two axle clamping bolts and two axel clamping nuts, wherein the axle attachment device is a saddle-shape member with two axle attachment holes, wherein the two axel clamping bolts are inserted through two air spring lower mount holes, wherein the axel clamping bolts are inserted through the two axle attachment holes in the axle attachment device, wherein the axle attachment device and the two axel clamping bolts are secured with two axle clamping screws.

17. A rear air suspension bracket assembly device consisting of, an air spring, an air spring upper mount, an air spring lower mount, wherein the air spring upper mount has a cradle, wherein the air spring lower mount is attached to a suspension member, wherein the air spring upper mount is attached to an unmodified chassis by an upper attachment device, wherein the air spring is secured at an upper end to the air spring upper mount, and wherein the air spring is secured at a lower end to the air spring lower mount, wherein the air spring lower mount is secured to the suspension member by a lower attachment device, wherein the cradle structure extends under the unmodified vehicle chassis and provides an amount of limitation to movement of the device against the vehicle frame, wherein the upper attachment device is one or more adjustable chassis hooks, wherein the adjustable chassis hooks are attached to the cradle of the upper air spring mount by two or more adjustable chassis hook fasteners, wherein the one or more adjustable chassis hooks include slotted holes to allow the hooks to be secured against varying chassis widths before tightening the two or more adjustable frame hook fasteners.

18. A rear air suspension bracket assembly device consisting of, an air spring, an air spring upper mount, an air spring lower mount, wherein the air spring upper mount has a cradle, wherein the air spring lower mount is attached to a suspension member, wherein the air spring upper mount is attached to an unmodified chassis by an upper attachment device, wherein the air spring is secured at an upper end to the air spring upper mount, and wherein the air spring is secured at a lower end to the air spring lower mount, wherein the air spring lower mount is secured to the suspension member by a lower attachment device, wherein the cradle structure extends under the unmodified vehicle chassis and provides an amount of limitation to movement of the device against the vehicle frame, wherein the upper attachment device is one or more C-strap attachment devices, wherein the one or more C-strap attachment devices each comprise the C-strap and two bolts for C-strap, wherein the two bolts for C-strap are secure to opposite ends of the C-strap by nuts for C-strap, wherein the one or more C-strap attachment devices encircle the unmodified vehicle chassis, and secure the air spring upper mount to the vehicle chassis.

\* \* \* \* \*